(12) United States Patent
Kodama

(10) Patent No.: US 7,911,099 B2
(45) Date of Patent: Mar. 22, 2011

(54) OUTER ROTOR MOTOR

(75) Inventor: Yuji Kodama, Nagano (JP)

(73) Assignee: Shinano Kenshi Kabushiki Kaisha, Ueda-Shi, Nagano (JP)

( * ) Notice: Subject to any disclaimer, the term of this patent is extended or adjusted under 35 U.S.C. 154(b) by 170 days.

(21) Appl. No.: 12/289,827

(22) Filed: Nov. 5, 2008

(65) Prior Publication Data

US 2009/0115276 A1 May 7, 2009

(30) Foreign Application Priority Data

Nov. 6, 2007 (JP) ................................ 2007-288204

(51) Int. Cl.
H02K 5/16 (2006.01)
H02K 7/08 (2006.01)
(52) U.S. Cl. ............................ 310/90; 384/119; 384/124
(58) Field of Classification Search ............... 310/90; 384/119, 124
See application file for complete search history.

(56) References Cited

U.S. PATENT DOCUMENTS

| | | | | |
|---|---|---|---|---|
| 3,395,949 | A * | 8/1968 | Kun | 384/119 |
| 4,262,975 | A * | 4/1981 | Heshmat et al. | 384/119 |
| 4,494,027 | A * | 1/1985 | Otto | 310/89 |
| 4,623,810 | A * | 11/1986 | Smith | 310/90 |
| 4,682,065 | A * | 7/1987 | English et al. | 310/90 |
| 4,783,608 | A * | 11/1988 | Gruber et al. | 310/90 |
| 6,242,830 | B1 * | 6/2001 | Katagiri | 310/90 |
| 6,897,586 | B2 * | 5/2005 | Horng et al. | 310/90 |
| 6,936,940 | B2 * | 8/2005 | Kobayashi et al. | 310/67 R |
| 7,008,112 | B2 * | 3/2006 | Yamashita et al. | 384/119 |
| 7,088,023 | B1 * | 8/2006 | Gomyo et al. | 310/90 |
| 7,187,097 | B2 * | 3/2007 | Tanaka | 310/90 |
| 2004/0013329 | A1 * | 1/2004 | Yamashita et al. | 384/100 |

FOREIGN PATENT DOCUMENTS

| | | | |
|---|---|---|---|
| JP | 61052418 A | * | 3/1986 |
| JP | 6-74059 U | | 10/1994 |
| JP | 10051991 A | * | 2/1998 |
| JP | 10201164 A | * | 7/1998 |
| JP | 2000-125505 A | | 4/2000 |
| JP | 2003-32987 A | | 1/2003 |
| JP | 2003-324891 A | | 11/2003 |
| JP | 2004-236390 A | | 8/2004 |
| JP | 2005214239 A | * | 8/2005 |
| JP | 2006304565 A | * | 11/2006 |
| JP | 2007-236146 A | | 9/2007 |
| JP | 2007236118 A | * | 9/2007 |

OTHER PUBLICATIONS

Machine translation of cited document JP 2007236146 A.*

* cited by examiner

*Primary Examiner* — Quyen Leung
*Assistant Examiner* — Alex W Mok
(74) *Attorney, Agent, or Firm* — Birch, Stewart, Kolasch & Birch, LLP

(57) ABSTRACT

An outer rotor motor has a bearing housing with reduced machining and material costs, can be assembled with high accuracy, and has favorable durability. A bearing is attached to an inner circumferential surface of a housing main body that has been formed in a cylindrical shape by plastic deformation caused by press molding a metal matrix. At least one protruding surface is formed by plastic deformation so as to protrude further outward than the housing main body, and the stator core is attached to the outer circumference-side of the at least one protruding surface.

7 Claims, 2 Drawing Sheets

FIG.1
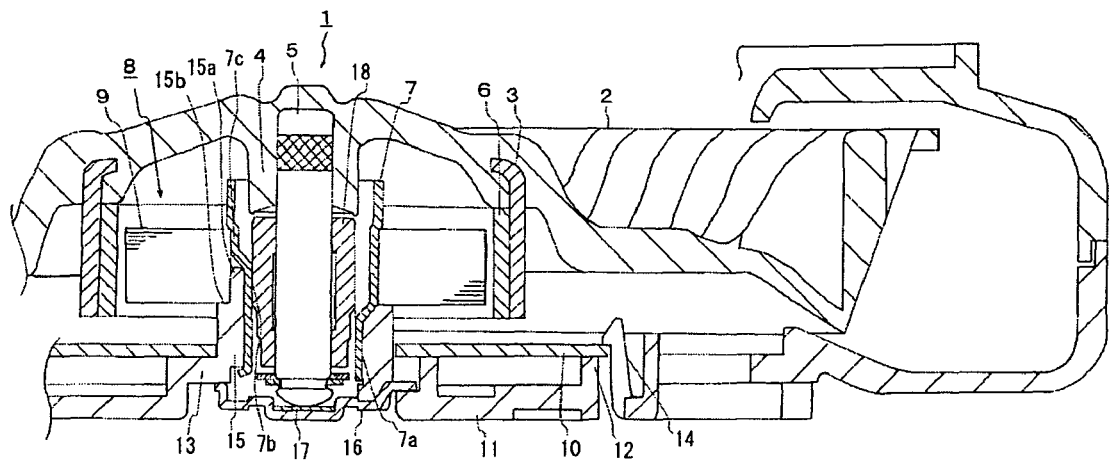
FIG.2C
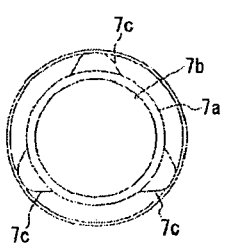
FIG.2A
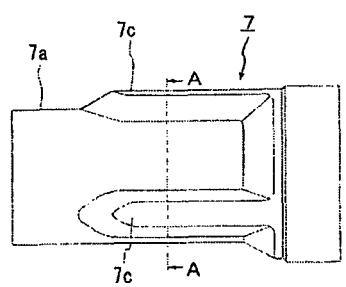
FIG.2B
FIG.2E
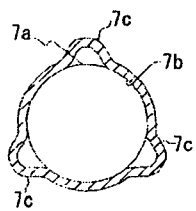
CROSS SECTION
A-A
FIG.2D
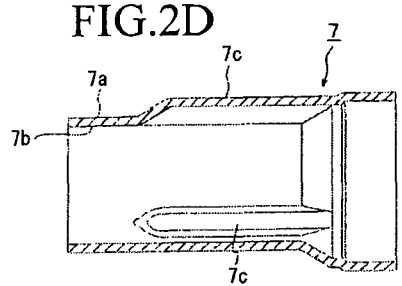
CROSS SECTION
B-B

OUTER ROTOR MOTOR

BACKGROUND OF THE INVENTION

1. Field of the Invention

The present invention relates to an outer rotor motor used for example in an OA appliance such as a printer, a copier, or a DVD drive, an in-vehicle appliance such as a seat cooler or a cooling fan, or a projector.

2. Related Art

One example of an outer rotor-type DC brushless motor will now be described. A housing in the form of a hollow cylinder is attached to a motor base, a bearing is attached to the inner circumference side of the housing, and a motor substrate and a stator core are attached to the outer circumference side of the housing. A rotor including a magnet is rotatably attached via the bearing with a rotor shaft of the rotor inserted inside the housing.

The housing is produced by machining from a metal matrix or cutting a material that has been molded in advance by die-cast molding for example, and is fixed to the motor base by screws or the like. Alternatively, the housing may be drawn into a cylindrical shape and fixed using screws (see Patent Document 1).

Other examples of housings in use are a housing that is integrally formed from a metal base material by burring (see Patent Document 2) and a construction where a bearing housing is integrally molded when molding a motor casing from resin (see Patent Document 3). Other housings in use are produced by combining resin molding with metal components (by insert or outsert molding).

Patent Document 1

Japanese Laid-Open Patent Publication No. 2003-32987

Patent Document 2

Japanese Laid-Open Patent Publication No. 2004-236390

Patent Document 3

Japanese Utility Model Publication No. H06-74059

SUMMARY OF THE INVENTION

However, when the housing is made by cutting, there are the problems of wasted material (which lowers the yield) and a component cost and/or machining cost being incurred when connecting the housing to the motor base. Also, when the housing is formed from carrying out burring on a metal base material or is drawn into a simple cylindrical shape, changes in thickness that accompany press molding and limitations on the thickness of the material make it difficult to set the dimensions of the stator inner diameter and the bearing outer diameter. Such housing cannot be used in motors where there is a large difference between the stator inner diameter and the bearing outer diameter. When the housing and the casing are both integrally molded from resin, the force with which components are attached to the inner and outer circumferences of the housing is susceptible to variation due to changes in temperature (i.e., due to thermal expansion), and there is poor durability due to abrasion and deformation.

The present invention was conceived to solve the problems described above and it is an object of the present invention to provide an outer rotor motor that uses a thin material and has a lower machining cost due to the use of press molding, that can be used even when there is a large difference between the stator inner diameter and the bearing outer diameter, and is relatively unaffected by the dimensional accuracy with which components are attached to the inside and outside of the housing, resulting in high durability.

To achieve the stated object, an outer rotor motor according to the present invention includes: a bearing that supports a motor shaft; a stator core; and a bearing housing, wherein the bearing is attached to an inner circumference side of the bearing housing and the stator core is attached to an outer circumference side of the bearing housing, the bearing housing has a housing main body that is formed in a cylindrical shape by plastic deformation caused by press molding a metal matrix, and the bearing is attached to an inner circumferential surface of the housing main body, and at least one protruding surface is formed on the bearing housing by plastic deformation so as to protrude further outward than the housing main body and the stator core is attached to an outer circumference side of the at least one protruding surface.

The bearing housing may include the housing main body, which has been produced by one of drawing a metal sheet into a cylinder and press forming a metal cylinder, and the at least one protruding surface, which is formed by plastic deformation so as to protrude further outward than the housing main body.

Also, a core supporting portion, including a front end that is inserted into a gap between the housing main body and the stator core and a stepped portion that supports the stator core, may be integrally molded with a casing from resin.

By using the outer rotor motor described above, the bearing housing has a housing main body that is formed in a cylindrical shape by plastic deformation caused by press molding a metal matrix and the bearing is attached to an inner circumferential surface of the housing main body. At least one protruding surface is formed on the bearing housing by plastic deformation so as to protrude further outward than the housing main body, and the stator core is attached to an outer circumference side of the at least one protruding surface. In this way, by molding the bearing housing in a shape that includes at least one protruding surface, it is possible to adjust the projecting amount by press molding even in a motor where there is a large difference between the stator inner diameter and the bearing outer diameter. Also, by providing the at least one protruding surface that protrudes further outward than the housing main body by press molding, it is possible for the elasticity of the curved portions to absorb stress during press fitting, which increases dimensional tolerances. Here, by combining the bearing housing which is press molded and a casing which is molded from resin, since the stator core and the bearing are pressed onto and attached to the inner and outer circumferential surfaces of the bearing housing, it is possible to provide an outer rotor motor that has high concentricity, can be accurately assembled, and has high durability.

Since the bearing housing may include the housing main body, which has been produced by drawing a metal sheet into a cylinder using a press mold or by molding a metal cylinder using a press mold, and the at least one protruding surface, which is molded by plastic deformation using a press mold so as to protrude further outward than the housing main body, it is possible to form the bearing housing with little dimensional fluctuations and with a low machining cost.

Also, if a core supporting portion, which includes a front end that is inserted into a gap between the housing main body and the stator core and a stepped portion that supports the stator core, is integrally molded with the casing from resin, by using a core supporting portion that is integrally molded in an arbitrary shape together with the casing, it is possible to position the stator core while filling a gap between the housing and the stator core that is formed outside the housing, which makes it easier to assemble the motor components and improves the assembled accuracy. It is also possible to fix the housing main body and the casing by partially crimping, for example, an end part of the housing in a state where the stator core has been fitted onto the housing.

BRIEF DESCRIPTION OF THE DRAWINGS

FIG. 1 is a cross-sectional view showing the principal part of an outer rotor motor;

FIGS. 2A to 2E are respectively a front elevation, a right elevation, a left elevation, a cross-sectional view along the line A-A, and a cross-sectional view along the line B-B of a bearing housing.

DESCRIPTION OF THE PREFERRED EMBODIMENTS

Figure 3A:
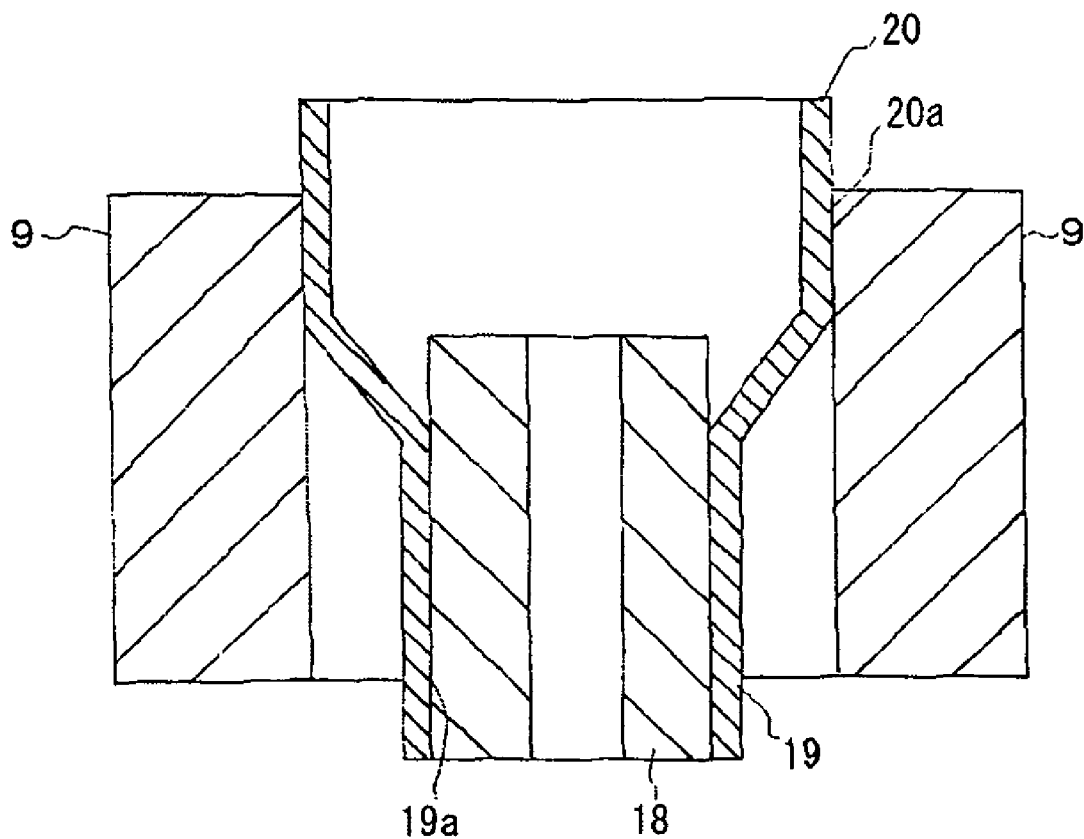
FIGS. 3A and 3B are cross-sectional views showing other examples of a bearing housing.

Preferred embodiments of an outer rotor motor according to the present invention will now be described with reference to the attached drawings. In these embodiments, an outer rotor-type DC brushless motor will be described as one example.

The overall construction of a DC brushless motor will now be described with reference to FIG. 1.

In FIG. 1, an integral construction where an impeller 2 has been insert-molded with a cylindrical rotor yoke 3 is used as a rotor 1. A motor shaft 5 is integrally fixed to a hub 4 of the impeller 2. A ring-shaped magnet 6 is fixed to an inner circumferential surface of the rotor yoke 3. The magnet 6 is magnetized so that north poles and south poles are alternately formed in the circumferential direction. The motor shaft 5 is rotatably supported by a bearing 18 that is press fitted into a bearing housing 7 provided on the stator.

The stator 8 has a stator core 9 fitted onto an outer circumference side of the bearing housing 7 which is in the form of a metal cylinder. The stator core 9 is covered with an insulator, not shown, and a motor coil is wound around teeth. A motor substrate 10 on which a motor driving circuit is provided is supported by ribs 12 and a stepped portion 13 that are provided on a casing 11, and is attached by a snap fit fastener 14.

A front end 15a of a core supporting portion 15 that is formed so as to be erected in a cylindrical shape on the casing 11 is inserted into a gap between a housing main body 7a and the stator core 9, and the stator core 9 is supported by a stepped portion 15b of the core supporting portion 15. The core supporting portion 15 is integrally molded with the casing 11 from resin. A thrust cover 16 is attached to a base portion of the core supporting portion 15. A thrust receiver 17 is fitted into a concave in the thrust cover 16 and supports a shaft end of the motor shaft 5. A low friction resin that is resistant to abrasion, such as polyether ether ketone, is favorably used as the thrust receiver 17.

The bearing housing 7 has the bearing 18 (for example an oil-impregnated sintered bearing or a ball bearing) that supports the motor shaft 5 attached to an inner circumference side thereof and the stator core 9 attached to the outer circumference side thereof. The housing main body 7a of the bearing housing 7 is fitted into the inner circumference side of the core supporting portion 15 that is cylindrical.

In FIGS. 2A and 2D, the bearing 18 is press fitted into an inner circumferential surface 7b of the housing main body 7a that is in the form of a metal cylinder and is attached to the bearing housing 7 by bonding or the like (see FIG. 1). The stator core 9 is press fitted onto outer circumference-side protruding surfaces 7c that are formed at a plurality of positions (at three positions in the present embodiment: see FIGS. 2B, 2C, and 2E) by press molding the housing main body 7a and is attached by bonding or the like (see FIG. 1).

In this way, by molding the bearing housing 7 in a shape that includes the protruding surfaces 7c, it is possible to apply the present invention to a motor where there is a large difference between the inner diameter of the stator core 9 and the outer diameter of the bearing 18. Also, by providing the protruding surfaces 7c that protrude further outward than the housing main body 7a by press molding, it is possible for the elasticity of the curved portions to absorb stress during press fitting, which increases dimensional tolerances. Here, by combining the bearing housing 7 which is press molded and the casing 11 which is molded from resin, since the stator core 9 and the bearing 18 are pressed onto and attached to the inner and outer circumferential surfaces of the bearing housing 7, it is possible to utilize the flexibility and high molding freedom of resin (i.e., the ability to produce complex shapes) and to provide an outer rotor motor that has high concentricity and can be accurately assembled.

As the bearing housing 7, it is possible to use a housing produced by drawing a plate-like metal material (such as brass, stainless steel, or an electrolytically zinc-coated carbon steel sheet) into a cylindrical shape or a housing where a plurality of the protruding surfaces 7c are formed on the outer circumference side by causing plastic deformation to a cylinder of the metal materials mentioned above.

As the bearing housing 7, as shown in FIG. 3A, it is also possible to form a large-diameter portion 20 that is continuous with a small-diameter portion (i.e., the housing main body) 19 from a metal matrix. That is, the bearing 18 may be attached to an inner circumferential surface 19a of the small-diameter portion 19 and the stator core 9 may be attached to an outer circumferential surface 20a of the large-diameter portion 20.

Figure 3B:
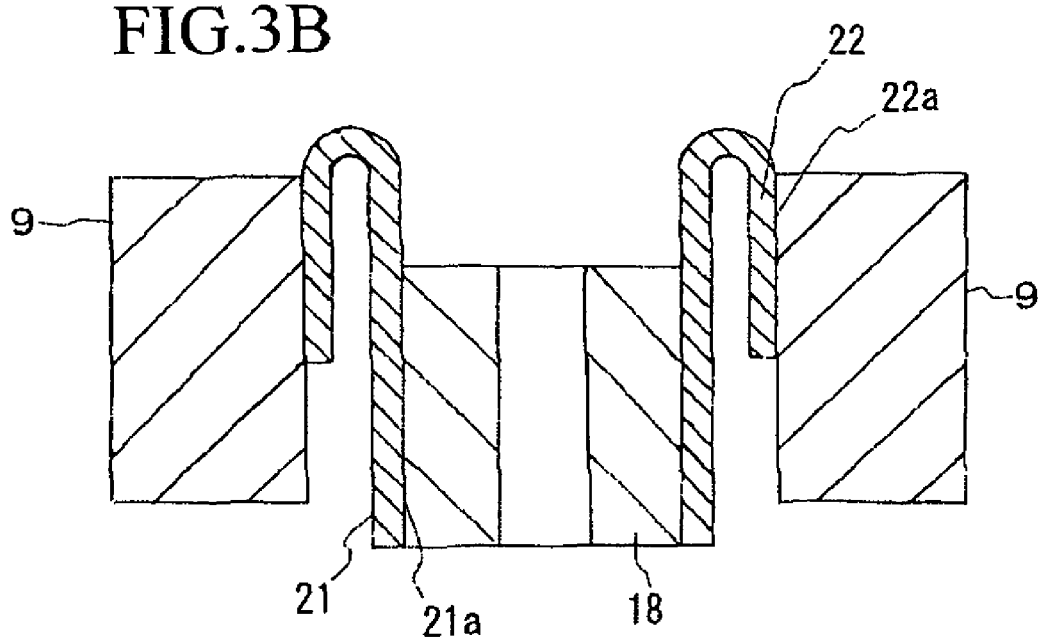

Alternatively, as the bearing housing 7, as shown in FIG. 3B, it is possible to form a cylindrical portion (i.e., the housing main body) 21 and a folded-back portion 22 that is continuous with the cylindrical portion 21 from a metal matrix. The folded-back portion 22 may be formed by drawing a plate-like metal material, for example. That is, the bearing 18 may be attached to an inner circumferential surface 21a of the cylindrical portion 21 and the stator core 9 may be attached to an outer circumferential surface 22a of the folded-back portion 22.

In the embodiments described above, protruding surfaces 7c provided on the housing main body 7a of the bearing housing 7 may be formed at a plurality of positions in the circumferential direction as shown in FIG. 2A, or a continuous surface may be used, like the large-diameter portion 20 shown in FIG. 3A or the folded-back portion 22 shown in FIG. 3B.

Provided that sufficient accuracy can be achieved for the inner diameter of the shaft hole of the bearing 18, protruding portions where parts of a cylindrical member are caused to protrude inward in the radial direction may be provided to attach the bearing 18. In this case, the outer circumference side forms a base cylindrical portion (i.e., housing main body) to which the stator core 9 is attached.

Also, although the present embodiment has been described with reference to a DC brushless motor, the present invention can also be applied to other types of outer rotor motor, such as a motor with brushes or an AC motor.

What is claimed is:

1. An outer rotor motor comprising:
a bearing that supports a motor shaft;
a stator core; and
a bearing housing,
wherein the bearing is attached to an inner circumference side of the bearing housing and the stator core is attached to an outer circumference side of the bearing housing,
the bearing housing includes a housing main body that is formed into a cylindrical shape by drawing a metal sheet or press-forming a metal cylinder, a plurality of protruding surfaces are formed on the housing main body by plastic deformation so as to protrude further outward than the housing main body, the protruding surface are equally spaced in the circumferential direction, the protruding surfaces extend in the longitudinal direction of the bearing housing,
a casing supports a motor substrate on which a motor driving circuit is provided,
a core supporting portion, that includes a stepped portion erected from the casing, is integrally molded with the casting from resin, a front end of the core supporting portion is fitted into a gap between the protruding surfaces of the housing main body so as to support the bearing housing, the bearing is attached to an inner circumferential surface of the housing main body, the stator core is fitted with the protruding surfaces of the housing main body, and the stator core is attached with being supported by the stepped portion.

2. The outer rotor motor according to claim 1, wherein three protruding surfaces are formed in the housing main body.

3. The outer rotor motor according to claim 1, wherein the metal sheet of the bearing housing is brass.

4. The outer rotor motor according to claim 1, wherein the metal sheet of the bearing housing is stainless steel.

5. The outer rotor motor according to claim 1, wherein the metal sheet of the bearing housing is electrolytically zinc-coated carbon steel.

6. The outer rotor motor according to claim 1, wherein the bearing housing is formed with a large diameter portion that is continuous with a small diameter portion formed from a metal matrix.

7. The outer rotor motor according to claim 6, wherein the bearing is mounted to the inner circumferential surface of the small diameter portion and the stator core is mounted to an outer circumferential surface of the large diameter portion.

* * * * *